(12) United States Patent
Noh et al.

(10) Patent No.: US 7,909,999 B2
(45) Date of Patent: Mar. 22, 2011

(54) FILTER ASSEMBLY

(75) Inventors: Jin Hwan Noh, Seoul (KR); Hyun Young Kim, Seoul (KR)

(73) Assignee: Woongjin Coway Co., Ltd., Gongju-si, Chungcheongnam-do (KR)

( * ) Notice: Subject to any disclaimer, the term of this patent is extended or adjusted under 35 U.S.C. 154(b) by 0 days.

(21) Appl. No.: 12/086,514

(22) PCT Filed: Nov. 19, 2007

(86) PCT No.: PCT/KR2007/005805
§ 371 (c)(1),
(2), (4) Date: Nov. 14, 2008

(87) PCT Pub. No.: WO2008/153253
PCT Pub. Date: Dec. 18, 2008

(65) Prior Publication Data
US 2010/0163477 A1 Jul. 1, 2010

(30) Foreign Application Priority Data

Jun. 14, 2007 (KR) .................. 10-2007-0058545
Oct. 19, 2007 (KR) .................. 10-2007-0105638

(51) Int. Cl.
*B01D 29/00* (2006.01)
*B01D 35/153* (2006.01)
(52) U.S. Cl. ............... 210/236; 210/234; 210/235
(58) Field of Classification Search .............. 210/234, 210/235, 236, 335, 806, 146, 195.1, 252, 210/253, 323.2
See application file for complete search history.

(56) References Cited

U.S. PATENT DOCUMENTS

| 3,746,171 | A | * | 7/1973 | Thomsen | 210/234 |
| 4,904,382 | A | * | 2/1990 | Thomsen | 210/236 |
| 5,486,288 | A | * | 1/1996 | Stanford et al. | 210/235 |
| 5,744,030 | A | * | 4/1998 | Reid et al. | 210/235 |

(Continued)

FOREIGN PATENT DOCUMENTS

EP    1 277 398 A1    1/2003

(Continued)

OTHER PUBLICATIONS

Extended European Search Report dated Jul. 7, 2010 for corresponding European Patent Application No. 07834111.2.

(Continued)

*Primary Examiner* — In Suk Bullock
*Assistant Examiner* — Lynne Edmondson
(74) *Attorney, Agent, or Firm* — Ohlandt, Greeley, Ruggiero & Perle, L.L.P.

(57) ABSTRACT

Disclosed is a filter assembly including a filter cartridge including a housing, a filter provided inside the housing, and a cartridge connection portion provided at an upper portion of the housing, a head portion including a head connection portion to be coupled to the cartridge connection portion so that the filter cartridge can be attached and detached, a water inlet which introduces water to the filter cartridge, and a water outlet which discharges the water filtered by the filter cartridge, the head portion including a filter attaching and detaching lever which is movable between a first position, at which the head connection portion and the filter cartridge connection portion are coupled to each other, and a second position, at which the head connection portion and the filter cartridge connection portion are separated from each other, and can be supported by the head portion.

14 Claims, 8 Drawing Sheets

U.S. PATENT DOCUMENTS

| | | | |
|---|---|---|---|
| 5,914,037 A * | 6/1999 | Yen | 210/234 |
| 6,436,282 B1 * | 8/2002 | Gundrum et al. | 210/117 |
| 6,695,891 B2 * | 2/2004 | Reid | 55/495 |
| 2004/0163371 A1 | 8/2004 | Reid | |
| 2004/0164006 A1 * | 8/2004 | Brown et al. | 210/85 |
| 2005/0023206 A1 * | 2/2005 | Fritze | 210/235 |
| 2005/0167352 A1 | 8/2005 | Burrows et al. | 210/241 |

FOREIGN PATENT DOCUMENTS

| | | |
|---|---|---|
| JP | 2003-136055 | 5/2003 |
| JP | 2003-251110 | 9/2003 |
| JP | 2004-024955 | 1/2004 |
| JP | 2006-095510 | 4/2006 |
| JP | 2007-000706 | 1/2007 |

OTHER PUBLICATIONS

International Search Report corresponding to International Patent Application No. PCT/KR2007/005805 dated Mar. 12, 2008.

Japanese Office Action dated Aug. 24, 2010 for corresponding Japanese Patent Application No. 2009-519387.

* cited by examiner

FILTER ASSEMBLY

TECHNICAL FIELD

The present invention relates to a filter assembly that can be installed in a water purifier which purifies polluted water, and more particularly to a filter assembly in which a connector head portion, consisting of a plurality of filter cartridges, is integrally formed into a single module, and the filter cartridges can be easily attached to and detached from the connector head portion.

BACKGROUND ART

A filter is a filtering means used in apparatuses such as a water purifier and an ionizer, which produce functional water. As water pollution becomes severe, interest in the standard of cleanliness of drinking water and residential water is increasing. According to this situation, the demand for water purifiers comprising filters therein is dramatically increasing, and there are a lot of general users in homes and restaurants, in which such water purifiers are used.

The filters used in such water purifiers must be periodically replaced with new ones, but the replacement of the filters must generally be carried out by specialists trained by manufacturers of the water purifiers, because the filters are installed inside the water purifiers in a manner such that it is difficult for general users to replace the filters.

Even if a user tries to replace the filter himself or herself, since the filter is generally securely assembled and consists of a plurality of parts having a complex structure, it is difficult for an ordinary person to replace the filter without technical knowledge. Accordingly, this places an additional burden on manufacturers as well as users every time the users replace the filters.

Further, since a plurality of parts is needed to assemble the filter having the complex structure, raw material costs for preparing individual parts are incurred, which results in the increase of the manufacturing cost and the user's cost for the use of the water purifier. In particular, since a water purifier needs a plurality of filters, instead of using only a single filter, cost and labor for replacing the filters in the water purifier impose a heavy burden on users.

DISCLOSURE

Technical Problem

The invention is made in view of the above-mentioned problems, and thus provides a filter assembly having a simple structure so that a user can easily install and uninstall it by himself or herself.

Technical Solution

In order to accomplish the object, there is provided a filter assembly including a filter cartridge including a housing, a filter provided inside the housing, and a cartridge connection portion provided at an upper portion of the housing; and a head portion including a head connection portion to be coupled to the cartridge connection portion so that the filter cartridge can be attached thereto and detached therefrom, a water inlet which introduces water to the filter cartridge, and a water outlet which discharges the water filtered by the filter cartridge, wherein the head portion includes a filter attaching and detaching lever which is movable between a first position, at which the head connection portion and the filter cartridge are coupled to each other, and a second position, at which the head connection portion and the filter cartridge are separated from each other, and can be supported by the head portion.

It is preferable that the filter assembly includes a plurality of filter cartridges and the head portion has a plurality of water inlets and a plurality of water outlets.

It is preferable that the head portion does not need any additional connection means or fitting means because each of fluid passage which makes the water inlet and the water outlet communicate with the filter cartridge, is integrally formed into a single body.

It is preferable that the filter attaching and detaching lever includes a lever body, a collar flange installed to protrude from the lever body to be oriented in an outer circumferential direction, and an extending portion which extends from the lever body in the longitudinal direction of the lever body and is provided with a locking protrusion at an end thereof, wherein a lever spring is inserted between an inner surface of the lever body of the filter attaching and detaching lever and an outer surface of the head connection portion so as to impart elastic force to the filter attaching and detaching lever.

It is preferable that the head connection portion includes a connection portion body having an outer surface on which the lever spring is installed, and a fixing member, which is inserted into a fixing slit formed in the connection portion body and moves into or out of the connection portion body through the fixing slit, wherein the fixing member moves into the connection portion body through engagement with the lever body of the filter attaching and detaching lever and is inserted into the fixing groove formed in the cartridge connection portion when the filter attaching and detaching lever is in the first position, so that the head connection portion and the cartridge connection portion are coupled to each other.

It is preferable that the head connection portion includes a pushing member inserted into a pushing member receiving portion formed around an inner surface of the connection portion body, and a pushing spring inserted into the pushing member receiving portion and putting elastic force on the pushing member in a single direction, wherein the fixing member is disengaged from the lever body when the filter attaching and detaching lever moves from the first position to the second position, simultaneously moves out of the connection portion body by pressure of the pushing member, and is separated from the fixing groove of the cartridge connection portion, so that the head connection portion and the cartridge connection portion can be decoupled from each other.

It is preferable that the fixing member limits movement of the lever body of the filter attaching and detaching lever when the filter attaching and detaching lever moves to the second position and moves out of the connection portion body, so that the filter attaching and detaching lever is fixed at the second position.

It is preferable that the cartridge connection portion has the fixing groove in an outer surface thereof, and a pressing surface of the cartridge connection portion pushes the pushing member upward when the cartridge connection portion is coupled to the head connection portion, so that the pushing member releases the fixing member and wherein the lever body of the filter attaching and detaching lever presses the fixing member, which is released by elastic force of the lever spring, and the filter attaching and detaching lever moves from the second position to the first position.

It is preferable that the plurality of filter cartridges includes a first filter cartridge having a first filter including a pre-filter, which filters water introduced from the head portion, in a housing, a second filter cartridge having a second filter including a membrane filter, which filters the water passing out of the first filter cartridge, in a housing, and a third filter cartridge having a third filter including a carbon filter, which filters the water passing out of the second filter cartridge, in a housing.

It is preferable that each of the head connection portions to be coupled to the first filter and the third filter cartridge is provided with one water inlet and one water outlet, and wherein the head connection portion to be coupled to the second filter cartridge is provided with a water inlet, a water outlet, and a drain.

It is preferable that the head portion includes a first water inlet, which communicates with an inlet of the first filter cartridge and guides externally supplied water to the first filter, a first water outlet, which communicates with an outlet in the first filter cartridge and discharges the water passed through the first filter therethrough, a second water inlet, which communicates with an inlet in the second filter cartridge and guides the water discharged through the first water outlet to the second filter, the drain, which communicates with a discharge hole in the second filter cartridge and discharges domestic waste water which is filtered by the second filter, a second water outlet, which communicates with an outlet in the second filter cartridge and discharges the water passed through the second filter therethrough, a third water inlet, which communicates with an inlet in the third filter cartridge and guides the water discharged through the second water outlet to the third filter, and a third water outlet, which communicates with an outlet in the third filter cartridge and discharges the water passed through the third filter.

It is preferable that the head portion includes a plurality of connection fluid passages which make the water inlets, the water outlets, and the drain communicate with the inlets, outlets, and the discharge hole in the corresponding filter cartridges, and each of the connection fluid passages is provided with a check fitting which stops a flow of water introduced from each of the corresponding water inlets when the filter cartridges and the head portion are decoupled from each other.

It is preferably that the head portion further includes a connector, which is a connection fluid passage which makes the second water outlet and the third water inlet communicate with each other.

It is preferable that the filter assembly further includes a key groove formed in the outer surface of the cartridge connection portion in an axial direction and a protruding portion formed in the inner surface of the head connection portion to be coupled to the cartridge connection portion so as to correspond to the key groove.

ADVANTAGEOUS EFFECTS

With the filter assembly according to the invention, since the head portion, in which a plurality of filter cartridges is installed, is integrally formed into a single module, the structure of the filter assembly is simplified. As a result, it is possible to increase throughput and decrease the manufacturing cost thanks to the simple structure. Further, since the filter cartridges can be easily attached and detached, it is possible to increase the convenience of user thereof.

BRIEF DESCRIPTION OF KEY ELEMENTS OF DRAWINGS

110: Head portion
112, 113, 114: Head connection portion
116: Pushing member receiving portion
117: Fixing slit
118: Locking groove
120: Filter attaching and detaching lever
121: Locking protrusion
123: Lever body
124: Fixing member
126: Pushing member
128: Pushing spring
130, 140, 150: Filter cartridge
139, 149, 159: Filter
132, 142, 152: Housing
155: Pressing surface
156: Fixing groove
163: Key groove
164: Protruding portion

MODE FOR INVENTION

The above-mentioned objects, features, and other advantageous effects of the invention may be apparent from the description of the best mode which is described below and the accompanying drawings. Hereinafter, a filter assembly according to the best mode of the invention will be explained with reference to the accompanying drawings.

Figure 1:
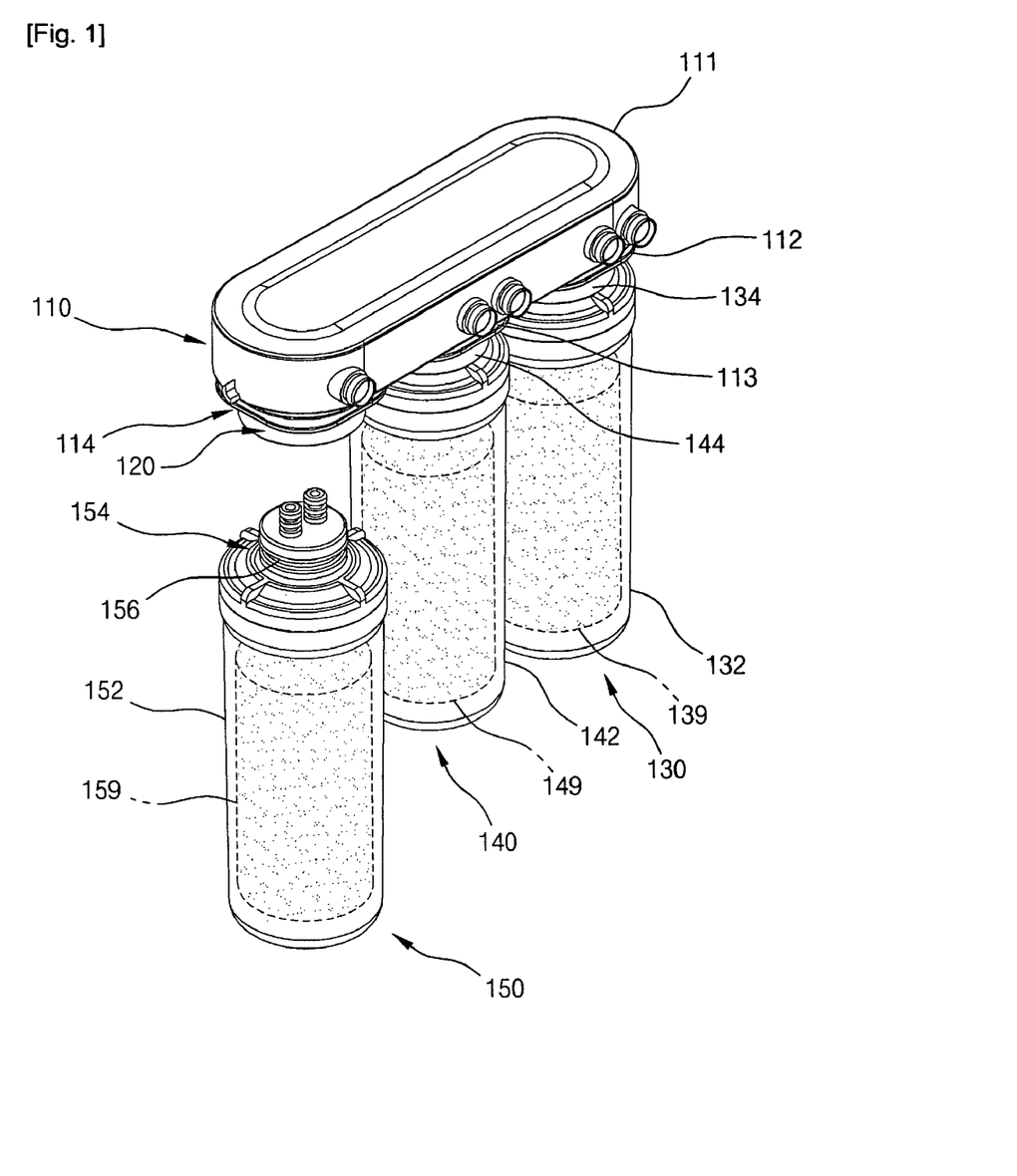
FIG. 1 is a perspective view illustrating a filter assembly according to one embodiment of the invention.
Figure 2:
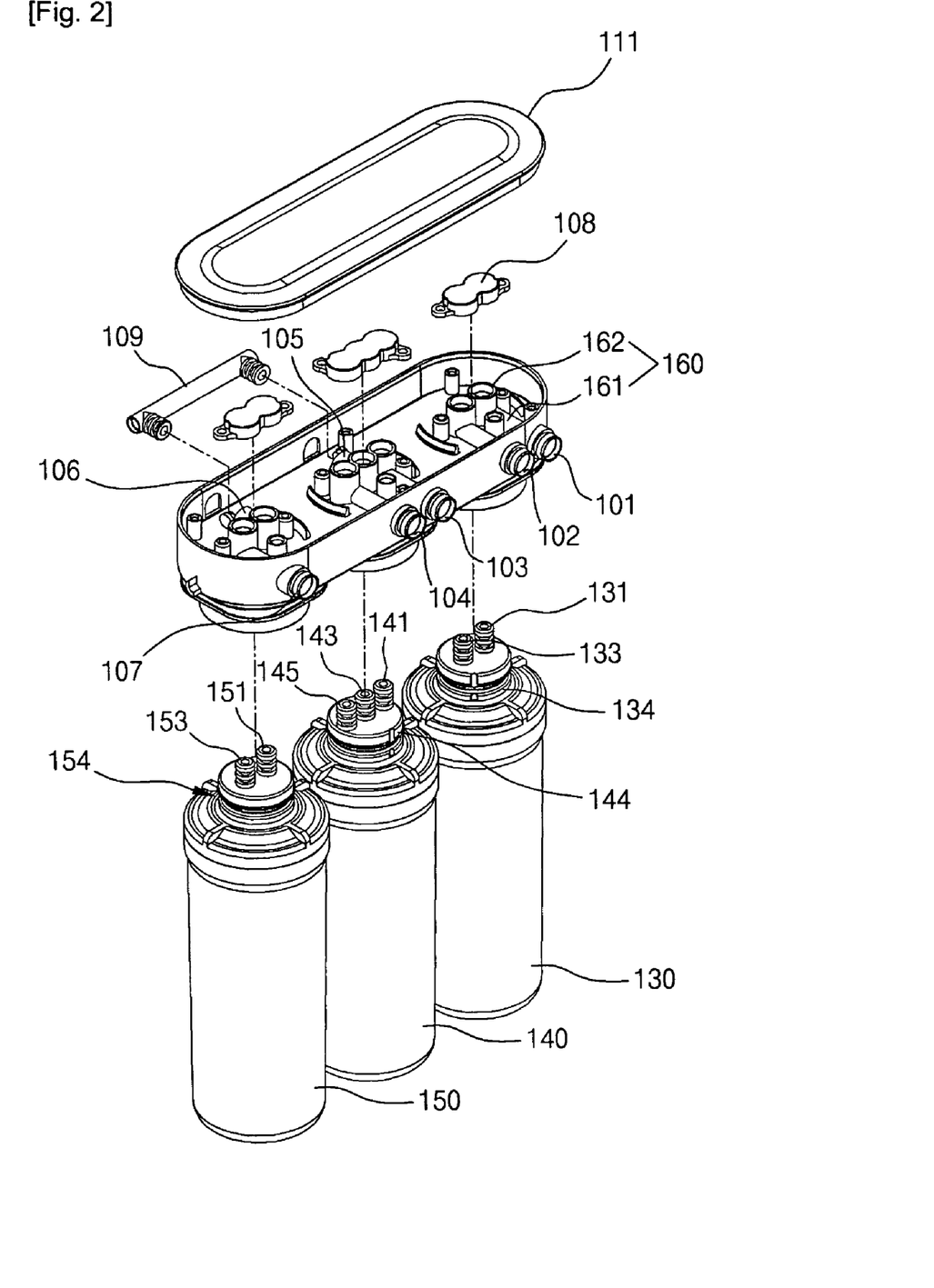
FIG. 2 is an exploded perspective view illustrating a head portion and a filter cartridge of the filter assembly of FIG. 1.
Figure 3:
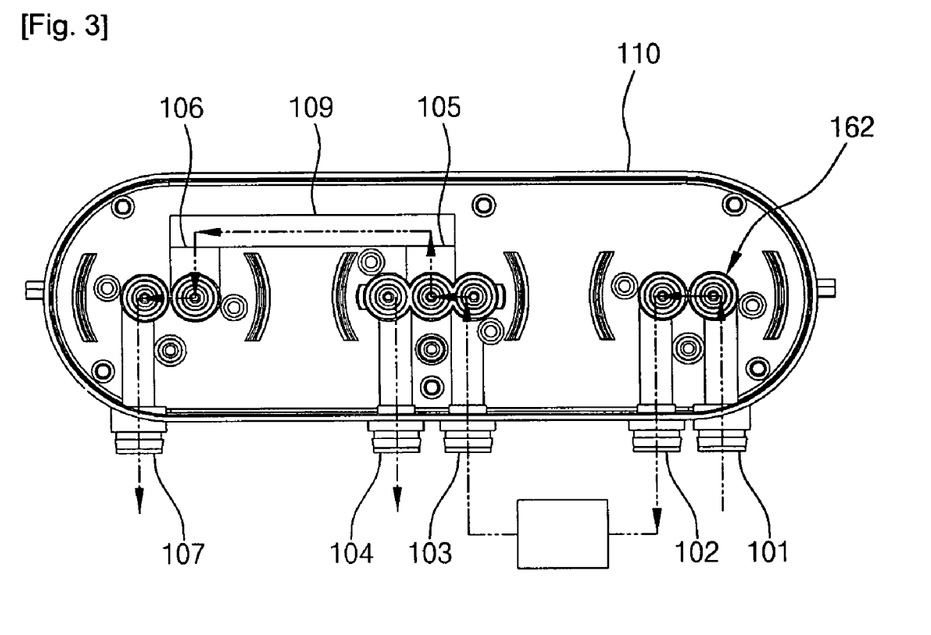
FIG. 3 is a plan view illustrating the head portion of FIG. 2, from which a head cover and an opening and closing member have been removed.

FIG. 1 is a perspective view illustrating a filter assembly according to one embodiment of the invention, FIG. 2 is an exploded perspective view illustrating a head portion 110 and a filter cartridge of the filter assembly of FIG. 1, and FIG. 3 is a plan view illustrating the head portion 110 of FIG. 2, from which a head cover 111 and an opening and closing member 108 have been removed.

With reference to FIGS. 1 to 3, the filter assembly according to one embodiment of the invention includes a plurality of filter cartridges 130, 140, and 150, in which filters 139, 149, and 159 are disposed inside housings 132, 142, and 152, respectively, and a head portion 110 having water inlets 101, 103, and 106, through which water is introduced into the filter cartridges, and water outlets 102, 105, and 107, through which water is discharged. The plurality of filter cartridges 130, 140, and 150 can be attached to and detached from the head portion 110. The filter cartridges 130, 140, and 150 have cartridge connection portions 134, 144, and 154, respectively, and the cartridge connection portions 134, 144, and 154 are connected respectively to corresponding head connection portions 112, 113, and 114 of the head portion 110, so that the water can be exchanged.

The head portion 110 includes a head cover 111 detachably coupled to an upper end of a head portion body. The head portion body includes the head connection portions 112, 113, and 114 to be connected with the cartridge connection portions 134, 144, and 154, respectively, the water inlets 101, 103, and 106, through which water to be filtered is introduced, and the water outlets 102, 105, and 107, through which the filtered water is discharged, and a plurality of fluid passages 160, along which water flows from the water inlets to the water outlets.

The water inlets include the first water inlet 101, through which water to be filtered at a first filtering step is introduced, the second water inlet 103, through which water to be filtered at a second filtering step is introduced, and the third water inlet 106, through which water to be filtered at a third filtering step is introduced. The water inlets 101, 103, and 106 are disposed at regular intervals on the outer circumferential surface of the head portion 110, and each water inlet can be connected with a hose through which water can be supplied.

The water outlets include the first water outlet 102, through which the water filtered at the first filtering step is discharged, the second water outlet 105, through which the water filtered at the second step is discharged, and the third water outlet 107, through which the water filtered at the third filtering step is discharged, and thus the water inlets 101, 103, and 106 are disposed at regular intervals on the outer circumferential surface of the head portion 110, and can be connected with respective hoses through which water can be is supplied.

The first water inlet 101 is disposed to communicate with an inlet 131 of the first filter cartridge 130 for allowing externally introduced water to be supplied to the first filter 139. The first water outlet 102 is disposed to communicate with an outlet 133 of the first filter cartridge 130, so that the water passed out of the first filter 139 is discharged through the outlet 133. The second water inlet 103 is disposed to communicate with an inlet 141 of the second filter cartridge 140 so that the water discharged through the first water outlet 102 is introduced into the second filter 149. In addition, the drain 104 is disposed to communicate with a discharge hole 145 in the second filter cartridge 140, so that waste water filtered by the second filter 149 is discharged. The second water outlet 105 is disposed to communicate with an outlet 143 of the second filter cartridge 140, so that the water passed out of the second filter 149 is discharged therethrough.

The third water inlet 106 is disposed to communicate with an inlet 151 of the third filter cartridge 150 so that the water discharged through the second water outlet 105 is introduced into the third filter 159. The third water outlet 107 is disposed to communicate with an outlet 153 of the third filter cartridge 150 so that the water passed out of the third filter 159 is discharged therethrough. Alternatively, it is preferable that the second water outlet 105 of the head portion 110 be connected with the third water inlet 106 by a connector 109. Accordingly, the water discharged through the second water outlet 105 is rapidly introduced into the third water inlet 106 via the connector 109.

Meanwhile, the inlets 131, 141, and 151 in the filter cartridges 130, 40, and 150 are connected with the water inlets 101, 103, and 106 in the head portion 110, respectively via connection fluid passages 160. The outlets 133, 143, and 153 in the filter cartridges 130, 140, and 150 are connected with the water outlets 102, 105, and 107 in the head portion 110 via the connection fluid passage 160. The discharge hole 145 in the second filter cartridge 140 is connected with the drain 104 in the head portion 110 via the connection fluid passage 160.

As shown in the drawings, the connection fluid passages 160 consist of horizontal connection fluid passages 161, connected between the water inlets 101, 103, and 106, and the water outlets 102, 105, and 107 and the drain 104, and vertical connection fluid passages 162, first ends of which are connected with the horizontal connection fluid passages 161, and second ends of which are connected with the inlets 131, 141, and 151, the outlets 133, 143, and 153 of the filter cartridges 130, 140, and 150 and the discharge hole 145. The vertical connection fluid passages 162 are closed by opening and closing members 108 to prevent water discharge.

Figure 4:
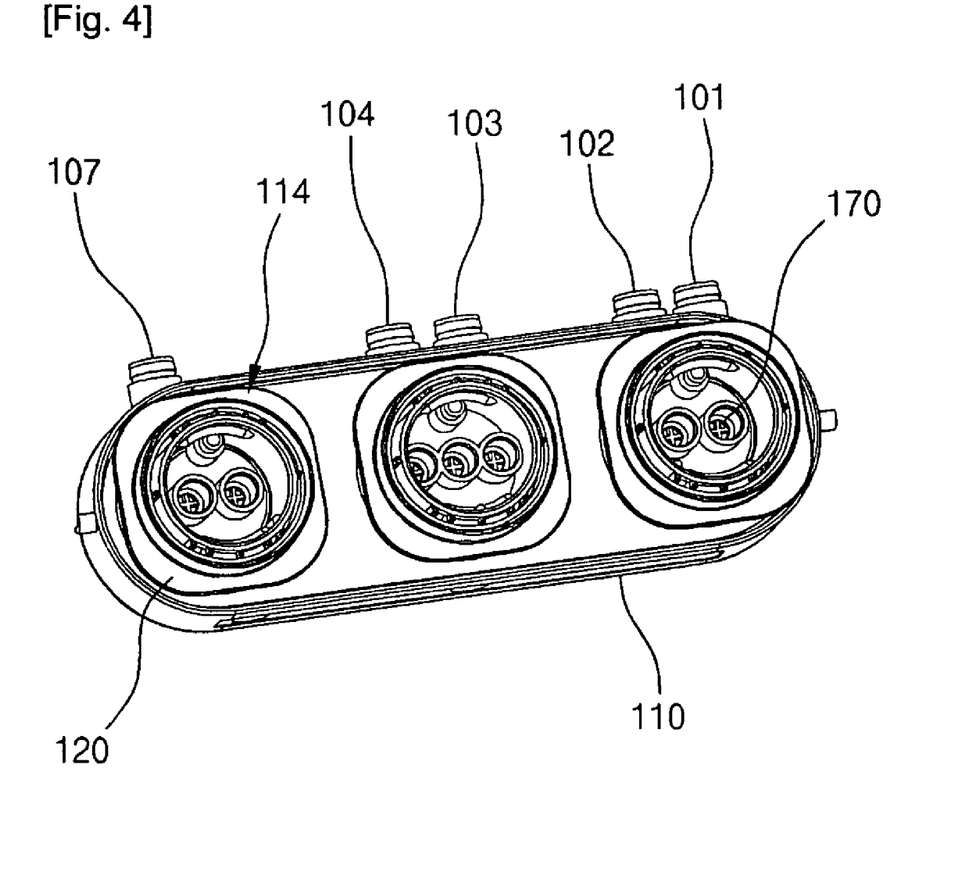
FIG. 4 is a rear perspective view illustrating the rear of the head portion of FIG. 2.

FIG. 4 is a rear perspective view illustrating the rear of the head portion 110. With reference to FIGS. 3 and 4, check fittings 170 are installed in the vertical connective fluid passages 162 in order to stop the flow of water introduced through the water inlets 101, 103, and 106 when the filter cartridge is separated from the head portion 110. Such a check fitting 170 is a known element, and the operation thereof will be described below in brief.

When water is introduced into the water inlet, the elastic member contracts in a water outlet direction as it is pressurized, so that a packing combined with the elastic member moves and thus creates a gap between the body, forming a fluid passage. As a result, the water is discharged through the water outlet. At this time, if the water supply is decreased, the pressure applied to the elastic member is lifted and the packing is returned to its original position. As a result, the water discharge is stopped.

Accordingly, with the use of the check fitting 170, the water flow is automatically stopped without the use of an additional valve which manually stops the flow of water which is introduced. Therefore, a user can easily install and uninstall the filter. Alternatively, according to this embodiment, the check fitting 170 is installed in the vertical connection fluid passage 162, but the invention is not limited thereto. That is, the check fitting 170 may be installed in the horizontal connection fluid passage 161.

With reference to FIGS. 1 to 3, the filter cartridge according to this invention includes a first filter cartridge 130, a second filter cartridge 140, and a third filter cartridge 150. The first to third filter cartridges are structured in a manner such that filters 139, 149, and 159 are installed inside housings 132, 142, and 152, respectively, and cartridge connection portions 134, 144, and 154 to be connected with head connection portions 112, 113, and 114 of the head portion 110 are formed at upper ends of the housings 132, 142, and 152, respectively.

The first and third filter cartridges 130 and 150 are provided with corresponding inlets 131 and 151 and corresponding outlets 133 and 153, respectively. The second filter cartridge 140 is provided with the inlet 141, the outlet 143, and the discharge hole 145. That is, besides the inlet and outlet, the second filter cartridge 140 is additionally provided with the discharge hole 145.

The first filter 139 is provided in the housing 132 of the first filter cartridge 130. The second filter 149 is provided in the housing 142 of the second filter cartridge 140. The third filter 159 is provided in the housing 152 of the third filter cartridge 150.

The first filter 139 is a filter which filters water introduced through the first water inlet 101 at a first filtering step, and may be a general pre-filter. That is, the first filter 139 filters off relatively large pollutants such as suspended solids. The second filter 149 is a reverse osmosis filter, which filters the water filtered by the first filter 139 at a second filtering step, and may be a general membrane filter. The domestic waste water purified by the first and second filters 139 and 149 is discharged through the discharge hole 145. The third filter 159 is a filter which filters the water filtered by the second filter 149 at a third filtering step, and may be a general carbon filter. The third filter 159 filters off microorganisms such as bacteria.

A filter attaching and detaching lever 120 is installed in the head portion 110. The filter attaching and detaching lever 120 moves between a first position (see FIG. 6), at which the head connection portions 112, 113, and 114 and the cartridge connection portions 134, 144, and 154 are coupled, respectively, and a second position (see FIG. 7), at which the head connection portions 112, 113, and 114 and the cartridge connection portions 134, 144, and 154 are separated, respectively.

Figure 5:
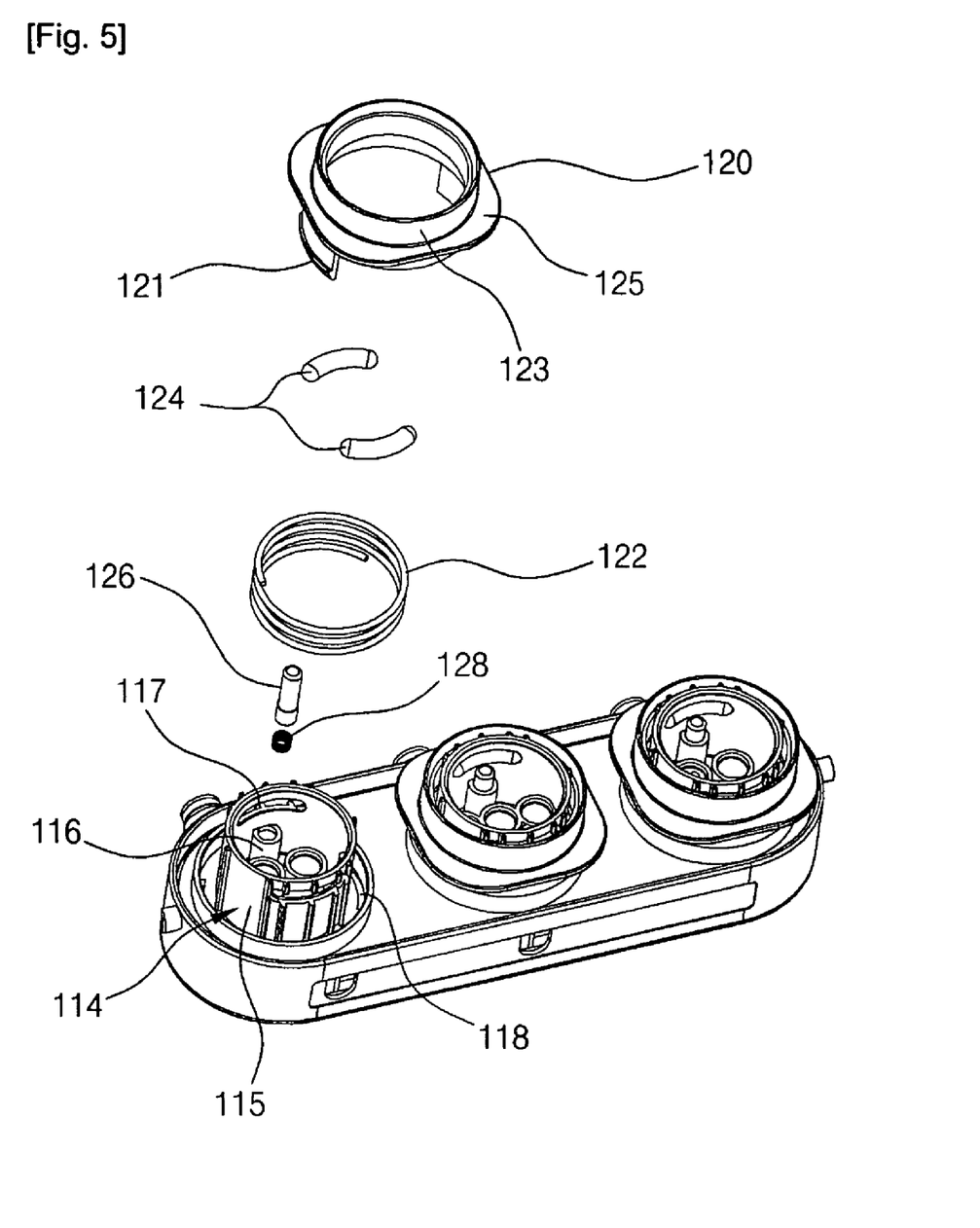
FIG. 5 is an exploded perspective view illustrating the head portion of FIG. 4.

FIG. 4 is a rear perspective view illustrating the head portion 110, and FIG. 5 is an exploded perspective view illustrating the head portion 110 of FIG. 4.

With reference to FIGS. 4 and 5, the filter attaching and detaching lever 120 is combined with the head connection portion 114 of the head portion 110, with a lever spring 112 interposed therebetween. That is, the lever spring 122 is disposed between the outer circumferential surface of a connection portion body 115 of the head connection portion 114 and the inner circumferential surface of a lever body 123 of the filter attaching and detaching lever 120, and applies elastic force to the filter attaching and detaching lever 120.

The filter attaching and detaching lever 120, according to one embodiment of the invention, includes a collar flange 125 installed to protrude from the outer surface of the lever body 123 along the outer circumference thereof. Further, a locking protrusion 121 is formed to protrude from an extending portion formed in the lower end of the lever body 123 in the longitudinal direction. The lever body 123 generally has the form of a cylinder.

On the other hand, a fixing member 124 is inserted into a fixing slit 117 formed in the connection portion body 115 of the head connection portion 114, and can move inwards or outwards of the head connection portion 114. When the cartridge connection portion 154 is inserted into the head connection portion 114, the fixing member 124 is inserted into the fixing groove 156 (see FIG. 1) of the cartridge connection portion 154, so that the cartridge connection portion 154 and the head connection portion 114 are securely coupled to each other.

The head connection portion 114 has a pushing member receiving portion 116, and a pushing member 126 is inserted in the pushing member receiving portion 116 with a pushing spring 128 interposed therebetween. The pushing member 126 is elastically supported by the pushing spring 128.

Hereinafter, with reference to FIGS. 6 and 7, the operation of attaching and detaching the filter assembly according to the invention will be described.

Figure 6:
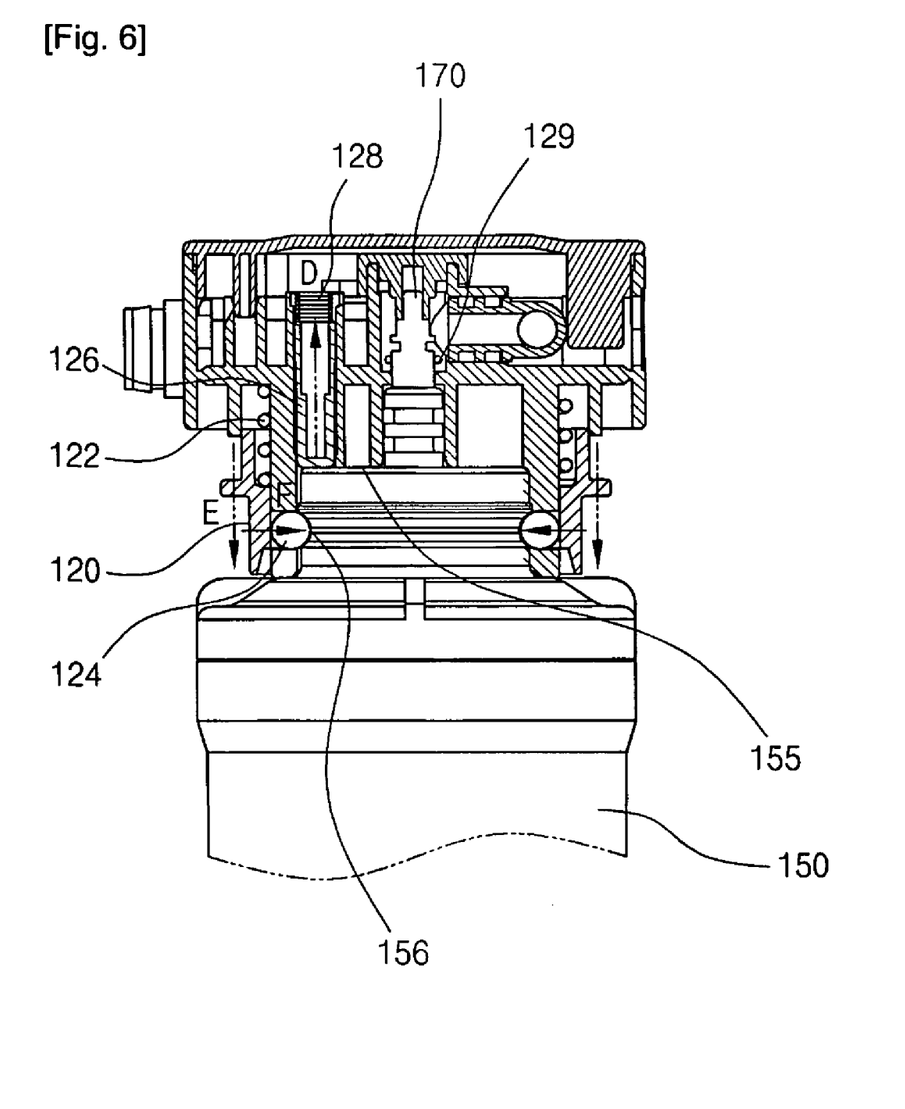
FIG. 6 is a cross-sectional view illustrating the head portion when a filter attaching and detaching lever is disposed at a first position (at which the head portion and the filter cartridge are coupled to each other)

FIG. 6 is a view illustrating the head connection portion and the cartridge connection portion when the filter attaching and detaching lever 120 is in the first position (i.e. when the head connection portion and the cartridge connection portion are connected to each other).

In FIG. 6, as the cartridge connection portion 154 is inserted, the pressing surface 155 pushes the pushing member 126, and the pushing member 126 moves upward in the direction of the arrow D. As the pushing member 126 moves upward, the pushing member 126 disengages from the fixing member 124.

At this time, the filter attaching and detaching lever 120 is moved in the direction of the arrow E by the elastic force of the lever spring 122 to put pressure on the fixing member 124, and the fixing member 124 is transported toward the inside of the head connection portion 114, as shown by the arrow F.

At this time, the fixing member 124 is inserted into the fixing groove 156 in the cartridge connection portion 154, which moves upward. Accordingly, the cartridge connection portion 154 and the head connection portion 114 are securely coupled to each other, and the head portion 110 and the filter cartridge 150 are connected so that water flows inside them.

Figure 7:
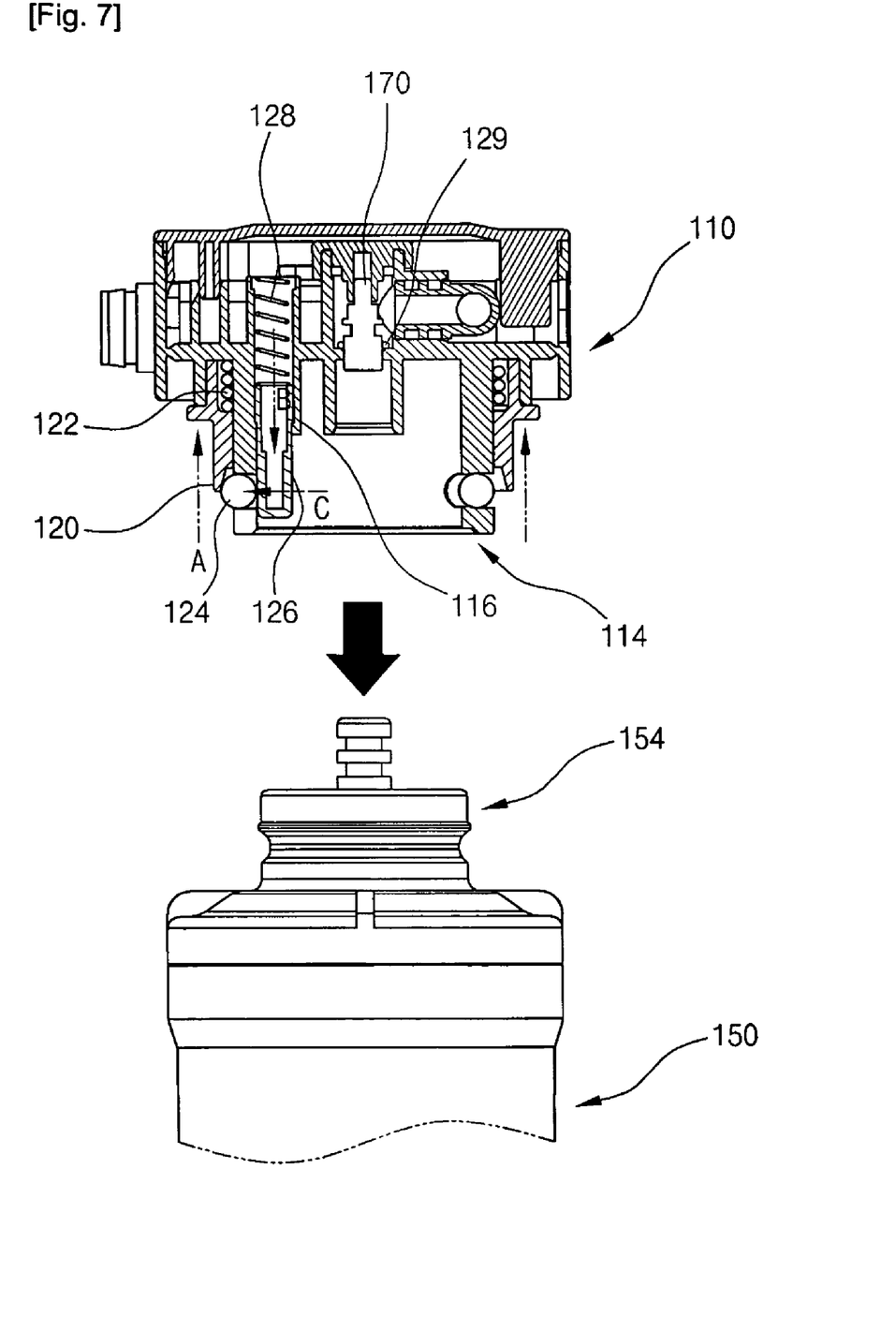
FIG. 7 is a cross-sectional view illustrating the head portion when the filter attaching and detaching lever is disposed at a second position (at which the head portion and the filter cartridge are separated apart from each other)

FIG. 7 shows the head connection portion and the cartridge connection portion when the filter attaching and detaching lever 120 is in the second position (at which the head connection portion and the cartridge connection portion are separated from each other).

In FIG. 7, in the state in which the head connection portion and the cartridge connection portion are coupled to each other, when the filter cartridge 150 is separated from the head section 110, the filter attaching and detaching lever 120 is first raised in the direction of the arrow A. As the filter attaching and detaching lever 120 is raised upward, the fixing member 124 is disengaged from the filter attaching and detaching member 120. At this time, the pushing member 126 is moved downwards, as shown by arrow B, by the elastic force of the pushing spring 128, and thus puts pressure on the fixing member 124. Due to the pressure applied by the pushing member 126, the fixing member 124 is pushed out of the head connection portion 114, as shown by the arrow C. Further, a portion of the fixing member 124 protrudes toward the outside of the head connection portion 114. On the other hand, the movement of the lower end of the filter attaching and detaching lever 120 is stopped by the protruding portion of the fixing member 124, and the position of the filter attaching and detaching lever 120 is fixed in such a state.

After that, the filter cartridge 150 can be separated from the head portion 110 in the direction shown by the thick solid arrow. That is, the cartridge connection portion 154 of the filter cartridge 150 can be separated from the head connection portion 114 of the head portion 110.

On the other hand, in the case in which the cartridge connection portion 154 is not coupled to the head connection portion 114 (see FIG. 7), the fluid passage of the head connection portion 114 is closed by the coupling between an O-ring 129 provided on the check fitting 170 and the inner surface of the head connection portion 114, and thus the water cannot pass through the fluid passage of the connection portion. Conversely, in the case in which the cartridge connection portion 154 is coupled to the head connection portion 114 (see FIG. 6), the fluid passage of the head connection portion 114 is opened, since the O-ring 129 provided on the check fitting 170 and the inner surface of the head connection portion 114 are spaced apart, the water can pass through the fluid passage of the head connection portion 114.

Figure 8:
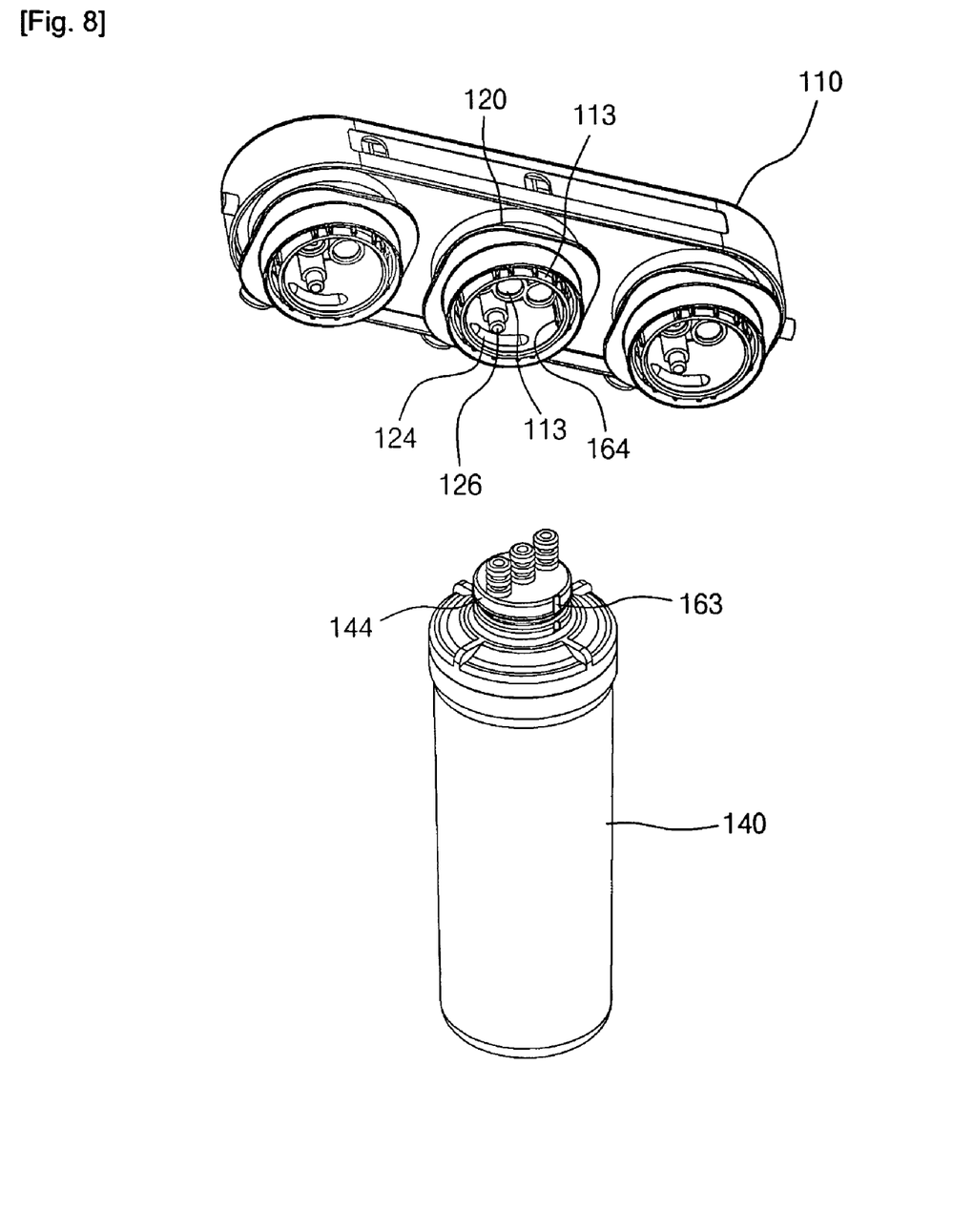
FIG. 8 is an underside perspective view illustrating the undersides of the head portion and the filter cartridge, which are separated from each other.

FIG. 8 is an underside perspective view illustrating the head portion and the filter cartridge when the head portion and the filter cartridge are separated from each other. As shown in FIG. 8, a key groove 163 is formed to extend in the longitudinal direction (axial direction) of the cartridge connection portion 144 on the outer surface of the cartridge connection portion 144. Further, a protruding portion 164 corresponding to the key groove 163 is formed on the inner surface of the head connection portion 113 to be coupled to the cartridge connection portion 144.

The key groove 163 and the protruding portion 164 may have semicircular or angular sectional shapes. Since the key groove 163 and the protruding portion 164 are formed, the filter cartridge 140 and the head portion 110 can be securely coupled to each other, and it is possible to prevent a fluid passage, formed in the upper portion of the cartridge connection portion 144, from being damaged by external shocks.

When key grooves of the cartridge connection portions have different shapes from each other, it is possible to prevent different kinds of filter cartridges from being coupled. That is, the first, second, and third filter cartridges 130, 140, and 150 have different uses, and if they are serially coupled in the wrong order, the water purifier malfunctions. Accordingly, it is possible to prevent the first to third filter cartridges from being coupled in the wrong order by making the shapes of respective key grooves and protruding portions different.

Further, with the different shapes of the respective key grooves and protruding portions, it is possible to prevent the filter cartridge from being inserted into the head portion from the right side to the left, and thus it is possible to achieve consistent directionality.

Although exemplary embodiments of the present invention have been shown and described, the invention is not limited to the above-described embodiments. That is, it will be apparent to those having ordinary skill in the art that a number of changes, modifications, or alterations to the invention as described herein may be made, none of which depart from the spirit of the present invention. All such changes, modifications, alterations, and equivalents should therefore be seen as within the scope of the present invention.

What is claimed is:

1. A filter assembly comprising:
    a filter cartridge including a housing, a filter provided inside the housing, and a cartridge connection portion provided at an upper portion of the housing;
    a head portion including a head connection portion to be coupled to the cartridge connection portion so that the filter cartridge is attached thereto and detached therefrom, a water inlet which introduces water to the filter cartridge, and a water outlet which discharges the water filtered by the filter cartridge;
    wherein the head portion includes a filter attaching and detaching lever which is movable between a first position, at which the head connection portion and the filter cartridge are coupled to each other, and a second position, at which the head connection portion and the filter cartridge are separated from each other, and is supported by the head portion;
    wherein the filter attaching and detaching lever includes a lever body and a lever spring inserted between an inner surface of the lever body of the filter attaching and detaching lever and an outer surface of the head connection portion; and
    wherein the head connection portion includes:
        a connection portion body including an outer surface on which the lever spring is installed;
        a pushing member inserted into a pushing member receiving portion formed around an inner surface of the connection portion body; and
        a pushing spring inserted into the pushing member receiving portion and putting elastic force on the pushing member in a single direction.

2. The filter assembly according to claim 1, wherein the filter assembly includes a plurality of filter cartridges and the head portion has a plurality of water inlets and a plurality of water outlets.

3. The filter assembly according to claim 1, wherein the head portion does not need any additional connection means or fitting means because each of fluid passage which makes the water inlet and the water outlet communicate with the filter cartridge, is integrally formed into a single body.

4. The filter assembly according to claim 1, wherein the filter attaching and detaching lever comprises:
    a collar flange installed to protrude from the lever body to be oriented in an outer circumferential direction; and
    an extending portion which extends from the lever body in the longitudinal direction of the lever body and is provided with a locking protrusion at an end thereof.

5. The filter assembly according to claim 4, wherein the head connection portion comprises:
    a fixing member, which is inserted into a fixing slit formed in the connection portion body and moves into or out of the connection portion body through the fixing slit,
    wherein the fixing member moves into the connection portion body through engagement with the lever body of the filter attaching and detaching lever and is inserted into the fixing groove formed in the cartridge connection portion when the filter attaching and detaching lever is in the first position, so that the head connection portion and the cartridge connection portion are coupled to each other.

6. The filter assembly according to claim 5,
    wherein the fixing member is disengaged from the lever body when the filter attaching and detaching lever moves from the first position to the second position, simultaneously moves out of the connection portion body by pressure of the pushing member, and is separated from the fixing groove of the cartridge connection portion, so that the head connection portion and the cartridge connection portion can be decoupled from each other.

7. The filter assembly according to claim 6, wherein the fixing member limits movement of the lever body of the filter attaching and detaching lever when the filter attaching and detaching lever moves to the second position and moves out of the connection portion body, so that the filter attaching and detaching lever is fixed at the second position.

8. The filter assembly according to claim 7, wherein the cartridge connection portion has the fixing groove in an outer surface thereof, a pressing surface of the cartridge connection portion pushes the pushing member upward when the cartridge connection portion is coupled to the head connection portion, so that the pushing member releases the fixing member, and wherein the lever body of the filter attaching and detaching lever presses the fixing member, which is released by elastic force of the lever spring, and the filter attaching and detaching lever moves from the second position to the first position.

9. The filter assembly according to claim 2, wherein the plurality of filter cartridges comprises:
    a first filter cartridge having a first filter including a pre-filter, which filters water introduced from the head portion, in a housing;
    a second filter cartridge having a second filter including a membrane filter, which filters the water passing out of the first filter cartridge, in a housing; and
    a third filter cartridge having a third filter including a carbon filter, which filters the water passing out of the second filter cartridge, in a housing.

10. The filter assembly according to claim 9, wherein each of the head connection portions to be coupled to the first filter and the third filter cartridge is provided with one water inlet and one water outlet, and wherein the head connection portion to be coupled to the second filter cartridge is provided with a water inlet, a water outlet, and a drain.

11. The filter assembly according to claim 10, wherein the head portion comprises:

a first water inlet, which communicates with an inlet in the first filter cartridge and guides externally supplied water to the first filter, a first water outlet, which communicates with an outlet in the first filter cartridge and discharges the water passed through the first filter therethrough;

a second water inlet, which communicates with an inlet in the second filter cartridge and guides the water discharged through the first water outlet to the second filter;

the drain, which communicates with a discharge hole in the second filter cartridge and discharges domestic waste water which is filtered by the second filter;

a second water outlet, which communicates with an outlet in the second filter cartridge and discharges the water passed through the second filter therethrough;

a third water inlet, which communicates with an inlet in the third filter cartridge and guides the water discharged through the second water outlet to the third filter; and a third water outlet, which communicates with an outlet in the third filter cartridge and discharges the water passed through the third filter.

12. The filter assembly according to claim 11, wherein the head portion includes a plurality of connection fluid passages which make the water inlets, the water outlets, and the drain communicate with the inlets, outlets, and the discharge hole in the corresponding filter cartridges, and each of the connection fluid passages is provided with a check fitting which stops a flow of water introduced from each of the corresponding water inlets when the filter cartridges and the head portion are decoupled from each other.

13. The filter assembly according to claim 11, wherein the head portion further includes a connector, which is a connection fluid passage which makes the second water outlet and the third water inlet communicate with each other.

14. The filter assembly according to claim 1 or 2, further comprising a key groove formed in an outer surface of the cartridge connection portion in an axial direction and a protruding portion formed in an inner surface of the head connection portion to be coupled to the cartridge connection portion so as to correspond to the key groove.

* * * * *